United States Patent
Di Lullo Arias et al.

(10) Patent No.: US 7,448,449 B2
(45) Date of Patent: Nov. 11, 2008

(54) STRENGTH RETROGRESSION PREVENTER

(75) Inventors: Gino F. Di Lullo Arias, Rio de Janeiro (BR); Philip James Rae, Landridge Condo (SG)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 11/207,411

(22) Filed: Aug. 19, 2005

(65) Prior Publication Data

US 2007/0039734 A1 Feb. 22, 2007

(51) Int. Cl.
*E21B 33/13* (2006.01)

(52) U.S. Cl. .................. 166/292; 166/293; 166/294; 106/724; 106/819; 106/823

(58) Field of Classification Search ............. 166/292, 166/293, 294; 106/724, 819, 823
See application file for complete search history.

(56) References Cited

U.S. PATENT DOCUMENTS

| | | | | |
|---|---|---|---|---|
| 1,671,104 A | | 5/1928 | Eberly | |
| 2,910,372 A | * | 10/1959 | Ruskin | |
| 2,990,881 A | * | 7/1961 | Nathan et al. | |
| 3,118,500 A | * | 1/1964 | Maddox, Jr. et al. | ........ 166/246 |
| 3,122,513 A | * | 2/1964 | Dempsey | .................... 252/478 |
| 4,778,528 A | | 10/1988 | DeFosse | |
| 5,475,220 A | | 12/1995 | Hughes et al. | |
| 6,173,778 B1 | | 1/2001 | Rae et al. | |
| 6,776,237 B2 | | 8/2004 | Dao et al. | |
| 6,899,177 B2 | | 5/2005 | Chatterj et al. | |

FOREIGN PATENT DOCUMENTS

| | | |
|---|---|---|
| CA | 1243781 | 10/1988 |
| WO | WO 2005/039509 | 5/2005 |

OTHER PUBLICATIONS

Answer 85 of 139 Chemical Abstracts on STN☐☐☐☐JP 06064953, Kawachi et al. (Mar. 8, 1994). abstract only.*

* cited by examiner

*Primary Examiner*—Paul Marcantoni
(74) *Attorney, Agent, or Firm*—Jones & Smith, LLP; John Wilson Jones

(57) ABSTRACT

Cementitious slurries capable of controlling and/or preventing strength retrogression during the cementing of a formation contain a bismuth salt or derivative thereof. Bismuth trioxide is preferred. The cementitious slurry may further contain a density modifying agent and/or strength enhancer. The cementitious slurries of the invention are suitable for use over a broad temperature range of from about 45° F. to about 500° F.

28 Claims, No Drawings

STRENGTH RETROGRESSION PREVENTER

FIELD OF THE INVENTION

The invention relates to cementitious slurries containing a bismuth salt or derivative for controlling strength retrogression.

BACKGROUND OF THE INVENTION

Under normal conditions, hydraulic cements, such as Portland cement, quickly develop compressive strength upon introduction to a subterranean formation, typically within 48 hours from introduction. As time progresses, the cement develops greater strength while hydration continues. Depending on temperature, hydration is nearly complete and compressive strength increases become insignificant after a year from introduction.

At temperatures above 230° F., however, the cement reaches most of its final strength within the first few weeks from introduction into the formation. After that point, the cement starts to deteriorate, loses strength and gains permeability, a phenomenon known as strength retrogression. As the temperature further increases, strength retrogression becomes more severe. At about 450° F., the peak value of compressive strength is reached in less than 24 hours and subsequently declines. Further, the peak compressive strength at this temperature is much lower than the compressive strength developed at lower temperature conditions.

Strength deterioration is mainly caused by a change in the structure of the cement which, in turn, is created by chemical reactions. Such reactions are dependent on temperature and result in the conversion of calcium silicate hydrate and excess lime into alpha-dicalcium silicate hydrate, a mineral that has a lower bulk volume and higher porosity. Alpha-dicalcium silicate hydrates are weaker than calcium silicate hydrates.

Increasing the mix water ratio, often required to maintain slurry mixability, typically causes more severe strength retrogression since the resulting cement typically is more porous and permeable than heavier cement systems. To prevent strength retrogression in Portland cements, powder silica or silicon dioxide (sand) has been added in sufficiently high concentrations to render a Si:Ca ratio higher than 1. Even though silica sand is considered inert at ambient temperatures, when mixed with cement, it reacts with cement at temperatures above 250° F. to produce monocalcium silicate hydrates. These hydrates are less porous and stronger than alpha dicalcium silicate hydrate.

The minimum concentration of silica by weight of cement (BWOC) required to obtain a reasonable Si:Ca ratio is 20% and the preferred concentration is 35%, although many geothermal formulations require higher concentrations, up to 50% BWOC. In low-density cements prepared with mix water ratios higher than 55%, greater silica is required to stabilize the cement at higher temperatures. In some instances, 40 to 50% BWOC is required.

Silica fineness is also an important attribute. The use of fine silica produces brittle and harder cements, often with higher compressive strength. Coarser silica produces ductile and softer cements with lower compressive strength.

Interest in more flexible cements has increased during the last few years since such cements provide better zonal isolation in oil and gas wells; harder cements crack easily with cyclic stresses caused by pressure and temperature changes under downhole producing conditions. The flexibility of cement may further be improved by reducing its density. However, in deep, hot, high-pressure wells, this option is not available since high-density cements are required for well security and control. Unfortunately, silica is difficult to mix with cementitious slurry to render high-density cements. Since silica is 25% lighter than cement, mix slurries above 16.0 lbm/gal (1.92 SG) and heavy weight agents, such as hematite or manganese oxide, are often required to increase the ratio of mix water needed to maintain the requisite mixability. Further, since silica is a solid material, pre-blending with the cement is required when used at high concentrations. A separate container is therefore required for storage purposes, typically necessitating the storage of both blended and non-blended cement at the wellsite. This becomes more important and expensive in remote locations, and especially in offshore locations where space on drilling rigs is quite limited. Recently, a commercial version of a slurried suspension of a mix of silica sand/flour/fume has become available in an effort to circumvent this problem. However, high volumes of the silica slurry are required. It is difficult therefore to justify the economics of its use.

A need exists therefore for cementitious slurries capable of counteracting strength retrogression, especially when used at low concentrations. Such materials should be effective at concentrations less than 5% BWOC. For high-pressure high temperature applications, the material should also have a higher specific gravity than cement. Further, it is desired that such new cementitious slurries be more flexible than those slurries of the prior art which incorporated silica sand and silica flour.

SUMMARY OF THE INVENTION

The invention relates to cementitious slurries capable of controlling and/or preventing strength retrogression during the cementing of a formation. The slurries of the invention contain a cementitious material and a bismuth salt or derivative thereof. The slurry contains a low concentration of bismuth salt or derivative.

The cementitious slurry may further contain a density-modifying agent, such as sand, glass, fly ash, silica flour, aluminosilicates as well as glass or ceramic spheres.

Strength enhancers, such as silica-containing enhancers like silica powder, silica flour, fumed silica, silica sand, powdered silica and crystalline silica, may further be used to reduce or prevent the compressive strength of the set cement from decreasing over time.

The cementitious slurries of the invention are suitable for use over a broad temperature, ranging from about 45° F. to about 500° F. The resulting set cements exhibit a compressive strength suitable for use at normal cementing operating pressures.

DETAILED DESCRIPTION OF THE PREFERRED EMBODIMENTS

Cementitious slurries of the invention contain a cementitious material and a bismuth salt or derivative. The bismuth salt or derivative controls strength retrogression during cementing of a subterranean formation in an oil or gas well.

Acceptable as bismuth salts are bismuth trioxide, bismuth nitrate, bismuth chloride, bismuth citrate, bismuth iodide, bismuth lactate, bismuth hydroxide, bismuth nitrate, bismuth oxynitrate, bismuth oxalate, bismuth sesquioxide, bismuth oxybromide, bismuth oxychloride, bismuthic acid, bismuth oxycarbonate, bismuth acetate, bismuth benzoate, bismuth bromide, bismuth tartrate, bismuth potassium tartrate, bismuth sodium tartrate, bismuth ammonium citrate, bismuth trichloride, bismuth oxynitrate, and bismuth aluminate. Further suitable as bismuth salts or derivatives are $Bi_2S_3$ $Bi(VO_3)_3$, $BiVO_4$, $Bi_4(V_2O_7)_3$, BiO, $Bi_2O_5$, BiS, and $Bi_2O_4$. Derivatives of such salts, such as halo and alkylated substituted derivatives of the organic salts are also acceptable. A particularly preferred bismuth compound is bismuth trioxide.

A variety of cementitious materials may be utilized in the slurries of the invention including those comprised of calcium, aluminum, silicon, oxygen and/or sulfur which set and harden by reaction with water. Hydraulically active cementitious materials, suitable for use in the cementitious slurry, include materials with hydraulic properties, such as hydraulic cement, slag and blends of hydraulic cement and slag (slagment), which are well known in the art. Examples of suitable slagments include blends ranging from about 90% cement with 10% slag to 10% cement with 90% slag, with a particularly preferred blend of 60% slag with 40% cement with all percentages based on the dry weight of each component.

The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulic cements, for instance, include portland cements, aluminous cements, pozzolan cements, fly ash cements, silica fume and the like. Thus, for example, any of the oilwell type cements of the class "A-H" and "J" as listed in the API Spec 10, (1st ed., 1982), are suitable hydraulic cements.

The bismuth salt or derivative in the cementitious slurry is present at low concentrations, typically between from about 0.5 to about 25, preferably from about 1.25 to about 10, more preferably from about 1.5 to about 7.5, most preferably from about 2.5 to about 5.0, percent BWOC. Typically, less bismuth salt or derivative is needed when slag and blends of hydraulic cement and slag are used as the cementitious material.

Cementitious slurries of the invention may further contain a density-modifying agent in an amount effective to render the desired density of the slurry. For example, it may be desired to use a slurry having a specific gravity which is higher than the specific gravity of the cementitious material. This is especially the case where the cementitious slurry is to be used in high pressure, high temperature applications. Suitable density modifying agents to use in such instances include sand, glass, hematite, silica sand, fly ash, silica flour, hematite, barite and aluminosilicates.

Further, it may be desired to use low-density cement compositions to prevent fracturing of the subterranean zones and to prevent lost circulation from occurring. Glass or ceramic spheres, as well as fly ash, are especially desirably where it is desired to lower the density of the cement. For instance, hollow glass spheres may be added to impart a lower density to the cement composition in the range of from about 9 to about 13 pounds per gallon.

Strength enhancers, such as silica-containing enhancers like silica powder, silica flour, fumed silica, silica sand, powdered silica and crystalline silica, may further be used in an amount sufficient to reduce or prevent the compressive strength of the set cement from decreasing over time. In addition to providing cement strength retrogression properties, such enhancers may provide thickening and thixotropic properties to the cementitious slurry. This is especially evident with fumed silica, silica sand and silica flour.

The cementitious slurries of the invention may further include other additives commonly utilized in cement compositions and which are well known to those skilled in the art. For example, fluid loss control additives, set retarders, set accelerators, dispersing agents, extenders, etc. in such conventional amounts, for instance, of from about 0.2% to about 12% BWOC.

Further, the cementitious slurry of the invention may contain a foaming agent, such as a gas like nitrogen or air. The gas may be present in the foamed cement composition in an amount in the range of from about 20 to about 35 percent by volume of the cement slurry formed.

The water utilized in the compositions of this invention can be from any source provided it does not contain an excess of compounds that adversely affect other components in the cement compositions. For example, the water can contain various salts such as sodium, potassium, calcium chloride or the like. Generally, the water is present in a cement composition of this invention in an amount sufficient to form a pumpable slurry. The amount of mixing water in the slurry may range from about 30 to 150 weight percent based upon the dry weight of cement and preferably is in the range of about 35 to 90 weight percent.

The cementitious slurries of the invention may be utilized over a broad temperature range from about 45° F. to about 500° F. and at pressures ranging of from about 1,000 psi to about 4,000 psi. The slurries readily set at such temperatures and pressure as well as at higher temperatures and pressures. The cementitious slurries of the invention is suitable for cementing within subterranean formations for oil or gas wells after set.

The use of the bismuth salt further eliminates shipping, blending and storage of special mixtures with silica at remote or offshore locations. A more ductile cement is formed with the salt and the resulting cement is longer lasting. The life of the well is therefore extended.

The cementitious slurries are prepared or provided and placed in the subterranean zone to be cemented and allowed to set into an impermeable solid mass having the requisite compressive strength. The cementitious slurries have particular applicability in the cementing of a pipe string in a wellbore. The slurry is placed in the annulus between the exterior surfaces of a pipe string and the walls of a well bore in which the pipe string is disposed, and the slurry is allowed to set (and optionally foam) therein.

Generally, the final compressive strengths obtained with the slurries of the invention are above those typically required for oilfield use, i.e., between 1,000 and 2,000 psi. The flexural strength/compressive strength ratio and the tensile strength/compressive strength ratios typically are in the order of 0.35 and 0.25, respectively, these values being at least 50% higher than with silica. Thus, the cementitious slurries of the invention render a more ductile/flexible cements than those seen in the prior art.

The following examples illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

All parts are given in terms of weight units except as may otherwise be indicated.

EXAMPLES

Cementitious slurries were prepared by mixing neat Class G Portland cement and fresh water at 15.8 pounds per gallon (ppg). To the slurry was added 0.15 gallons per sack of cement (gps) of a phosphonate retarder (R-21 LB, a product of BJ Services Company) and the siliceous material or bismuth trioxide at room temperature. The resultant slurries were then cured at 350° F. All percentages are BWOC.

Compressive Strength, in psi, was measured at the designated period, in accordance with procedures set forth in API 10-A. The test has a margin of error of 15%. The results are tabulated in Table I.

TABLE I

| Ex. No. | Component | 1 day | 4 days | 7 days | 14 days | 28 days |
|---|---|---|---|---|---|---|
| Comp. Ex. 1 | Neat Cement | 1986 | 928 | N/A | N/A | N/A |
| Comp. Ex. 2 | 5% Silica | 1997 | 2626 | 1654 | 1069 | 1328 |
| Comp. Ex. 3 | 20% Silica Flour | 2797 | N/A | N/A | 5302 | N/A |
| Comp. Ex. 4 | 35% Silica Flour | 3111 | 2840 | 2796 | 5475 | 5613 |
| 5 | 1.5% Bismuth Trioxide | N/A | N/A | N/A | 1961 | N/A |
| 6 | 2.5% Bismuth Trioxide | 1959 | 1958 | 1596 | 2184 | N/A |
| 7 | 5% Bismuth Trioxide | 1911 | 1816 | 1589 | 2989 | 3281 |

Example 1 shows the retrogression effect at higher temperatures. Examples 2 and 3, containing 5% and 20% silica, illustrate more preferred results at high silica content. Example 4 having 35% silica illustrates a temperature-stabilized cement. Examples 5, 6 and 7, containing bismuth trioxide, show the prevention of strength retrogression of cement between 1.5% to 5% BWOC. As evidenced, there is a slight reduction in compressive strength during the first week. Thereafter, strength recovery and additional gain is obtained by the reaction of the cement with bismuth trioxide.

From the foregoing, it will be observed that numerous variations and modifications may be effected without departing from the true spirit and scope of the novel concepts of the invention.

What is claimed is:

1. A method of cementing a subterranean formation penetrated by an oil or gas well comprising placing into the subterranean zone of the formation to be cemented a cementitious slurry comprising a cementitious material and a bismuth salt or derivative and setting, wherein strength retrogression of the set cement is controlled or prevented by the presence of the bismuth salt in the cementitious slurry.

2. The method of claim 1, wherein the bismuth salt is selected from the group consisting of bismuth trioxide, bismuth nitrate, bisnmith chloride, bismuth citrate, bismuth iodide, bismuth lactate, bismuth hydroxide, bismuth nitrate, bismuth oxynitrate, bismuth oxalate, bismuth sesquioxide, bismuth oxybromide, bismuth oxychloride, bismuthic acid, bismuth oxycarbonate, bismuth acetate, bismuth benzoate, bismuth bromide, bismuth tartrate, bismuth potassium tartrate, bismuth sodium tartrate, bismuth ammonium citrate, bismuth trichloride, bismuth oxynitrate, and bismuth aluminate, $Bi_2S_3$ $Bi(VO_3)_3$, $BiVO_4$, $Bi_4(V_2O_7)_3$, $BiO$, $Bi_2O_5$), $BiS$, and $Bi_2O_4$.

3. The method of claim 2, wherein the bismuth salt is bismuth trioxide.

4. The method of claim 1, wherein the amount of bismuth salt or derivative in the slurry is between from about 0.50 to about 25 percent by weight.

5. The method of claim 4, wherein the amount of bismuth salt or derivative in the slurry is between from about 1.25 to about 10 percent by weight.

6. The method of claim 5, wherein the amount of bismuth salt or derivative in the slurry is between from about 2.5 to about 5.0 percent by weight.

7. The method of claim 1, wherein the cementitious material is a hydraulic cement comprised of calcium, aluminum, silicon, oxygen and/or sulfur.

8. The method of claim 1, wherein the cementitious material is a hydraulic cement, slag or a blend thereof.

9. The method of claim 1, wherein the cementitious slurry further comprises a strength enhancer selected from the group consisting of silica powder, silica flour, fumed silica, silica sand and crystalline silica.

10. The method of claim 1, wherein the cementitious slurry further comprises a density-modifying agent.

11. The method of claim 10, wherein the density-modifying agent is hollow or porous microspheres.

12. The method of claim 1, wherein the cementitious slurry further comprises a foaming agent.

13. A method of increasing the compressive strength of cement during cementing of a subterranean formation which comprises pumping into the formation a cementitious slurry comprising a cementitious material and a bismuth salt or derivative.

14. The method of claim 13, wherein the bismurh salt or derivative is bismuth trioxide.

15. The method of claim 13, wherein the amount of bismuth salt or derivative in the cementitious slurry is between from about 1.25 to about 10 percent by weight.

16. The method of claim 15, wherein the amount of bismuth salt or derivative in the cernentitious slurry is between from about 1.25 percent by weight to about 7.5 percent by weight.

17. The method of claim 16, wherein the amount of bismuth salt or derivative in the cementitious slurry is between from about 2.5 to about 5.0 percent by weight.

18. A method of controlling compressive strength retrogression of cement during cementing of a subterranean formation which comprises pumping into the formation a cementitious slurry comprising a cementitious material and a bismuth salt or derivative.

19. The method of claim 18, wherein the bismuth salt is selected from the group consisting of bismuth trioxide, bismuth nitrate, bismuth chloride, bismuth citrate, bismuth iodide, bismuth lactate, bismuth hydroxide, bismuth nitrate, bismuth oxynitrate, bismuth oxalate, bismuth sesquioxide, bismuth oxybromide, bismuth oxychloride, bismuthic acid, bismuth oxycarbonate, bismuth acetate, bismuth benzoate, bismrith hiomide, bismuth tartrate, bismuth potassium tartrate, bismuth sodium tartrate, bismuth ammonium citrate, bismuth trichloride, bismuth oxynitrate, and bismuth aluminate, $Bi_2S_3$ $Bi(VO_3)_3$, $BiVO_4$, $Bi_4(V_2O_7)_3$, $BiO$, $Bi_2O_5$), $BiS$, and $Bi_2O_4$.

20. The method of claim 19, wherein the bismuth salt is bismuth trioxide.

21. The method of claim 18, wherein the amount of bismuth salt or derivative in the slurry is between from about 0.50 to about 25 percent by weight.

22. The method of claim 21, wherein the amount of bismuth salt or derivative in the slurry is between from about 1.25 to about 7.5 percent by weight.

23. The method of claim 18, wherein the cementitious slurry further comprises a density-modifying agent.

24. The method of claim 18, wherein the cementitious slurry further comprises a strength enhancer.

25. The method of claim 24, wherein the strength enhancer is selected from the group consisting of silica powder, silica flour, fumed silica, silica sand and crystalline silica.

26. A method of cementing a pipe string in a wellbore which comprises introducing a cementitious slurry in an annulus between the pipe string and the wall of the wellbore in which the pipe string is disposed, and allowing the cementitious slurry to set, wherein the cementitious slurry comprises a cementitious material and a bismuth salt or derivative.

27. The method of claim 26, wherein the bismuth salt is selected from the group consisting of bismuth trioxide, bismuth nitrate, bismuth chloride, bismuth citrate, bismuth iodide, bismuth lactare, bismuth hydroxide, bismuth nitrate, bismuth oxynitrate, bismuth oxalate, bismuth sesquioxide, bismuth oxybromide, bismuth oxychloride, bismuthic acid, bismuth oxycarbonate, bismuth acetate, bismuth benzoate, bismuth bromide, bismurh tartrate, bismuth potassium tartrate, bismuth sodium tartrate, bismuth ammonium citrate, bismuth trichloride, bismuth oxynitrate, and bismuth aluminate, $Bi_2S_3$ $Bi(VO_3)_3$, $BiVO_4$, $Bi_4(V_2O_7)_3$, $BiO$, $Bi_2O_5)$, $BiS$, and $Bi_2O_4$.

28. The method of claim 27, wherein the bismuth salt is bismuth trioxide.

* * * * *

UNITED STATES PATENT AND TRADEMARK OFFICE
CERTIFICATE OF CORRECTION

PATENT NO. : 7,448,449 B2 Page 1 of 1
APPLICATION NO. : 11/207411
DATED : November 11, 2008
INVENTOR(S) : Gino F. Di Lullo Arias et al.

It is certified that error appears in the above-identified patent and that said Letters Patent is hereby corrected as shown below:

Title page item 54, and Col. 1 Title should read: "Method of Using Bismuth Salt or Derivative During Cementing"

Column 5, claim 2, line 49, replace "bisnmith" with "bismuth"

Column 6, claim 14, line 24, replace "bismurh" with "bismuth"

Column 6, claim 16, line 30, replace "cernentitious" with "cementitious"

Column 6, claim 19, line 48, replace "bismrith hiomide" with "bismuth bromide"

Column 7, claim 26, line 3, replace "welibore" with "wellbore"

Column 7, claim 27, line 10, replace "lactare" with "lactate"

Column 8, claim 27, line 3, replace "bismurh" with "bismuth"

Signed and Sealed this

Thirty-first Day of March, 2009

JOHN DOLL
*Acting Director of the United States Patent and Trademark Office*